US006696503B2

(12) United States Patent
Happ et al.

(10) Patent No.: US 6,696,503 B2
(45) Date of Patent: Feb. 24, 2004

(54) PROCESS FOR PREPARING CROSSLINKED ION EXCHANGERS BASED ON UNSATURATED ALIPHATIC NITRILES

(75) Inventors: Michael Happ, Dormagen (DE); Ralf-Jürgen Born, Langenfeld (DE); Reinhold Klipper, Köln (DE); Ulrich Schnegg, Leverkusen (DE); Hans-Karl Soest, Köln (DE); Wolfgang Zarges, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 159 days.

(21) Appl. No.: 09/739,025

(22) Filed: Dec. 14, 2000

(65) Prior Publication Data
US 2001/0006159 A1 Jul. 5, 2001

(30) Foreign Application Priority Data
Dec. 24, 1999 (DE) .......................... 199 62 935

(51) Int. Cl.$^7$ ................................. C08F 8/34
(52) U.S. Cl. ............................. 521/30; 521/31
(58) Field of Search ........................ 521/30, 31

(56) References Cited

U.S. PATENT DOCUMENTS

| 2,885,371 | A | * | 5/1959 | Tavani |
| 3,586,646 | A | * | 6/1971 | Corte |
| 3,637,535 | A | | 1/1972 | Corte et al. |
| 3,716,482 | A | | 2/1973 | Corte et al. |
| 3,916,025 | A | * | 10/1975 | Kunin ................. 423/242 |
| 4,090,014 | A | * | 5/1978 | Scheibler ............. 526/62 |
| 4,319,015 | A | | 3/1982 | Strüver et al. ........ 526/329.1 |
| 5,175,193 | A | | 12/1992 | Heller et al. ......... 521/31 |
| 6,159,591 | A | * | 12/2000 | Beihoffer ............ 428/327 |
| 6,376,072 | B1 | * | 4/2002 | Evans ................ 428/370 |

FOREIGN PATENT DOCUMENTS

EP 0 098 130 1/1984

* cited by examiner

Primary Examiner—Bernard Lipman
(74) Attorney, Agent, or Firm—Godfried R. Akorli; Diderico van Eyl

(57) ABSTRACT

The present invention relates to a process for preparing crosslinked ion exchangers with a homogeneous network structure based on unsaturated aliphatic nitriles in the presence of film-forming protective colloids.

5 Claims, No Drawings

PROCESS FOR PREPARING CROSSLINKED ION EXCHANGERS BASED ON UNSATURATED ALIPHATIC NITRILES

BACKGROUND OF THE INVENTION

The present invention relates to a process for preparing crosslinked ion exchangers with a homogeneous network structure based on unsaturated aliphatic nitrites in the presence of film-forming protective colloids, where the process carried out is not a seed/feed process.

Copolymerization of two or more monomers generally gives rise to polymers whose composition changes to some extent as conversion increases. Depending on the type of polymerization, two types of heterogeneity can be distinguished.

If the lifetime of the active group on the polymer chain is the same as the duration of the polymerization, as in the case of anionic polymerization, the composition changes along the chain. At any given juncture during the polymerization all of the polymer chains have the same overall composition.

If the lifetime of the active group on the polymer chain is significantly shorter than the overall reaction time, the composition of the polymer chains changes as the conversion proceeds in the polymerization. This second type of heterogeneity is typical of free-radical polymerization reactions in which the lifetime of the growing polymer radicals is in the region of seconds and the polymerization time in the region of hours.

This heterogeneity is associated with disadvantages for many applications. In the case of adsorber resins and ion exchangers, which are crosslinked bead polymers, non-crosslinked or very weakly crosslinked fractions are highly undesirable. These always arise if there is more than proportional incorporation of crosslinking agent, the concentration of which decreases markedly as the polymerization proceeds. A typical example of this is the acrylonitrile/divinylbenzene combination. Bead polymers and/or weakly acidic ion exchangers prepared from this combination contain considerable amounts of non-crosslinked polymers, which can exude and give products which are mechanically and osmotically unstable. Attempts are made to compensate for the drop in concentration of the crosslinking agent during the polymerization by either using a second crosslinking agent which is incorporated only slowly or feeding further amounts of the crosslinking agent whose concentration drops rapidly (in this case divinylbenzene). The second crosslinking agents used in industry are di- or triallyl compounds, such as 1,7-octadiene or trivinylcyclohexane. These substances react only incompletely and have to be carefully removed so that the resin does not cause difficulties in downstream applications. Feeding further amounts of the crosslinking agent is difficult and requires a sophisticated feed strategy, and there is also a limitation on the selection of the suspension stabilizers. Protective colloids frequently used in bead polymerization, such as gelatins, polyvinyl alcohol, or cellulose derivatives, are film-forming substances which are unsuitable since they inhibit the diffusion of the crosslinking agent into the polymerizing beads (EP-A 98,130).

There is therefore great interest in any process which does not have the disadvantages described above. Surprisingly, it has been found that unsaturated aliphatic nitrites, such as acrylonitrile, in combination with di- and polyvinyl ethers of alkanediols or of glycols build up a very homogeneous network and give products which do not have the disadvantages described above. It is possible to dispense with feeding of further amounts of the crosslinking agent and with the use of a second crosslinking agent.

The use of di- or polyvinyl ethers for crosslinking polymers is prior art.

EP-A 10,265 describes the preparation of synthetic resins based on crosslinked copolymers of mono- and polyvinyl compounds. A substantive feature of the invention is the joint use of two crosslinking agents, as stated in the Abstract: methacrylates of polyhydric alcohols and/or aromatic polyvinyl compounds and unsaturated hydrocarbons which have at least two allyl groups in the molecule and/or polyvinyl ethers of polyhydric alcohols. There is also an indication of the use of acrylonitrile in the bead polymers, but susceptibility to hydrolysis is described in the text as a serious disadvantage of known synthetic resins based on acrylonitrile.

U.S. Pat. No. 3,586,646 describes the use of divinyl ethers for preparing spongy cation exchangers having groups selected from the class consisting of sulfonic acid groups, carboxylic acid groups, phosphoric acid groups, and phosphonic acid groups, in the presence of a porogen (an organic solvent which dissolves the monomer but is a precipitant for the polymer). However, U.S. Pat. No. 3,586,646 does not describe the use of unsaturated nitrites in the bead polymers.

EP-A 98,130 describes the preparation of crosslinked copolymer beads by a seed/feed process, and describes the copolymer beads themselves and their use as adsorbers or, after introduction or addition of functional groups, as ion-exchange resins. Monomers mentioned for the seed and/or the feed include nitriles of acrylic and/or methacrylic acid, and crosslinking agents mentioned include polyvinyl ethers of glycol, glycerol, pentaerythritol, resorcinol or monothio- or dithio derivatives of glycols. The preparation of the seed/feed particles requires the absence of protective colloids, or a drastic reduction in the amount of these, as they prevent, or dramatically delay, the absorption of the feed component by the seed particles. The particles prepared according to EP-A 98,130 also show multistage swelling behaviour in toluene and birefringence in the form of a maltese cross under polarized light.

None of the patent applications/patents cited gives any indication as to how monomers and crosslinking agents have to be selected in order to obtain crosslinked bead polymers with a homogeneous network structure, particularly in the presence of film-forming protective colloids.

The object of the present invention was to prepare ion exchangers, preferably weakly acidic cation exchangers, having a homogeneous network structure and based on unsaturated aliphatic nitrites in the presence of film-forming protective colloids.

SUMMARY OF THE INVENTION

The present invention achieves this object in providing a process for preparing crosslinked ion exchangers comprising (a) polymerizing unsaturated aliphatic nitrites with di- or polyvinyl ethers as crosslinking agents and also with initiators in suspension in the presence of protective colloids, but not by a seed/feed process, to give bead polymers, and (b) functionalizing the resultant bead polymers to give ion exchangers.

If desired, other monovinyl compounds and/or other crosslinking agents and/or porogen may be added to the polymerization reaction mixture.

The bead polymers prepared by step (a) are likewise provided by the present invention. They have a homogeneous network structure and can be used as adsorber resins.

DETAILED DESCRIPTION OF THE INVENTION

In step (b) the bead polymers are functionalized by customary methods known to those skilled in the art to give ion exchangers, particularly weakly acidic cation exchangers. To prepare weakly acidic cation exchangers, the bead polymers obtained in step (a) are hydrolysed under alkaline conditions, subjected to ion-exchange if desired, and purified. Alkaline hydrolysis has proven to be a particularly effective and economic practical process. The weakly acidic cation exchangers preferably obtained by the novel process exhibit a particularly high capacity.

For the purposes of step (a) of the present invention, unsaturated aliphatic nitrites are defined by the general formula (I)

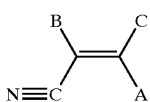
(I), wherein each of A, B, and C, independently of the others, represents hydrogen, alkyl, or halogen.

For the purposes of the present invention, the term "alkyl" refers to straight-chain or branched alkyl having from 1 to 8 carbon atoms (preferably from 1 to 4 carbon atoms). For the purposes of the present invention, the term "halogen" refers to chlorine, fluorine, or bromine.

For the purposes of the present invention, preferred nitriles are acrylonitrile and methacrylonitrile, and the use of acrylonitrile is particularly preferred.

For the purposes of step (a) of the present invention, suitable divinyl ethers are compounds of the general formula (II)

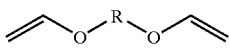
(II), wherein

R represents a radical selected from the group consisting of $C_nH_{2n}$, $(C_mH_{2m}-O)_p-C_mH_{2m}$, and $CH_2-C_6H_4-CH_2$, n is $\geq 2$, m is from 2 to 8, and p is $\geq 2$.

For the purposes of step (a) of the present invention, suitable polyvinyl ethers are trivinyl ethers of glycerol or trimethylolpropane or tetravinyl ethers of pentaerythritol.

It is preferable to use divinyl ethers of ethylene glycol, di-, tetra-, or polyethylene glycol or butanediol or polyTHF, or the tri- or tetravinyl ethers. Particular preference is given to the divinyl ethers of butanediol and diethylene glycol.

If desired, use may also be made of other monovinyl compounds and/or other crosslinking agents.

For the purposes of the present invention, suitable monomers are styrene and styrene derivatives, acrylic acid, and methacrylic acid and their esters, amides, and anhydrides, vinyl chloride, vinylidene chloride, vinyl acetate, and vinylpyrrolidone.

For the purposes of the present invention, suitable other crosslinking agents are divinylbenzene, di- and poly(meth) acrylates of glycols, of alkanediols having three or more carbon atoms, glycerol, trimethylolpropane, or pentaerythritol, 1,7-octadiene, and trivinylcyclohexane. Divinylbenzene is preferred. To increase the porosity of the beads use may be made of porogens. Suitable porogens in the novel process are organic solvents in which the monomers are soluble but which are poor solvents and, respectively, swelling agents with respect to the polymer produced. Examples of these compounds are those selected from the group of ketones, such as methyl isobutyl ketone or methyl ethyl ketone, from the group consisting of hydrocarbons, such as hexane, octane, isooctane, and isododecane, or from the group consisting of alcohols having four or more carbon atoms, such as butanols (Farbenfabriken Bayer, DBP 1,045,102 [1957], and DBP 1,113,570 [1957]).

The preparation of the weakly acidic cation exchangers preferred according to the present invention can be carried out by (α) polymerizing unsaturated aliphatic nitrites of the general formula (I) with di- or polyvinyl ethers and, optionally, further crosslinking agents and initiators in suspension in the presence of protective colloids, to give bead polymers, (β) subjecting the bead polymer to alkaline hydrolysis (preferably in an autoclave), and (γ) subjecting the hydrolyzed bead polymers to ion-exchange from the salt form (preferably Na form) into the H form by dilute mineral acid (preferably 10% strength $H_2SO_4$), preferably in a column, (δ) optionally, purifying the H form of the bead polymers with water in an autoclave and, finally, (ε) optionally, classifying the bead polymers into desired particle size ranges in a column.

The bead polymer may also be screened, if necessary.

The suspension polymerization according to the invention is carried out in the presence of protective colloids and, if desired, in the presence of dispersing agents. It is advisable to use compounds that are stable in the presence of salts, such as hydroxyethylcellulose or condensation products of naphthalenesulfonic acid with formaldehyde in the presence of the alkali metal or alkaline earth metal salts of hydrohalic acids or of sulfuric acid (particularly preferably of NaCl, $Na_2SO_4$, or $CaCl_2$). The salts reduce the solubility of the monomers in the aqueous phase. To reduce agglomeration, pH buffers made from borate or phosphate may be added. For the purposes of the present invention, suitable free-radical initiators are peroxides, hydroperoxides, peresters, azo initiators and other initiators with half-life times $t_{1/2}$ of 1 hour at from 60 to 140° C. (AKZO Nobel company publication: Initiators for High Polymers). Examples of preferred initiators suitable for the novel process are peroxy compounds, such as dibenzoyl peroxide, dilauroyl peroxide, bis(p-chlorobenzoyl) peroxide, dicyclohexyl peroxydicarobnate, tert-butyl peroctoate, tert-butyl peroxy-2-ethylhexanoate, 2,5-bis(2-ethylhexanoylperoxy)-2,5-dimethylhexane, or tert-amyl peroxy-2-ethylhexane, or else azo compounds, such as 2,2'-azobis(isobutyronitrile) or 2,2'-azobis(2-methylisobutyronitrile). Preferred initiators have half-life times $t_{1/2}$ of 1 hour at from 75 to 110° C. It is particularly preferable to use dibenzoyl peroxide, tert-butyl peroxy-2-ethylhexanoate, or azoisobutyronitrile.

The polymerization is preferably carried out in two stages. The main reaction is first completed at a temperature of from 50 to 80° C. and then completed at an elevated temperature. It is particularly preferable to carry out a polymerization at from 65 to 75° C., followed by an increase of the temperature to 85–100° C.

To prepare the weakly acidic ion exchangers preferred according to the present invention, the bead polymers are hydrolyzed by aqueous sodium hydroxide in an autoclave. Preference is given to alkaline hydrolysis with aqueous/methanolic sodium hydroxide. Another possibility is hydrolysis at atmospheric pressure by aqueous/methanolic sodium hydroxide. However, acid hydrolysis by mineral acids is also possible, based on the prior art. Reference is made to EP-A 406,648 concerning the conduct of the hydrolysis at superatmospheric pressure. Preference is given to procedure 1, in which the bead polymer forms an initial charge and the aqueous sodium hydroxide is fed. Once the hydrolysis is complete, the resin is washed through, subjected to ion-exchange using 10% strength $H_2SO_4$ at 90° C. and then washed until neutral. For purification, the resin is treated with water or, respectively, steam at an elevated temperature. Fine-particle constituents may then be removed in a classifying column.

The novel bead polymers from step (a) and (α), respectively, have wide application as adsorbers.

The novel weakly acidic macroporous cation exchangers may be used in the food or drink industry or for drinking water treatment, for example. They are particularly suitable for removing cations/hardness from drinking water (e.g., in household filters) and for decarbonizing drinking water, or else decarbonizing liquids used as food or drink or in preparing food or drink. Other important applications are removal of cations/hardness from sugar solutions or solutions of organic products, e.g., of beet sugar, of cane sugar, or of starch sugar or, respectively, glycerol, gelatin, etc., desalination of water during preparation of ultrahigh-purity water, decarbonization of service water (in the cocurrent process), in association with a strongly acid cation exchanger for the desalination of water for industrial steam generation, as a buffer filter downstream of desalination plants for binding alkali metal ions, in the neutralization of regeneration wastewater from desalination plants, in the sodium form for binding heavy metals, such as copper, nickel or zinc, from solutions at pH>5 in the absence of calcium ions, and of complexing agents.

The novel weakly acidic macroporous cation exchangers may also be used to remove polar or nonpolar compounds or heavy metals from aqueous or organic solutions from the chemical industry, electronics industry, food or drink industry, waste-disposal industry, or waste-reclamation industry.

The novel bead polymers and/or ion exchangers may in particular be used for removing polar compounds from aqueous or organic solutions, for removing polar compounds from process streams from the chemical industry, for removing organic components from aqueous solutions or from gases, for example, from acetone or chlorobenzene, or for removing heavy metals or precious metals, arsenic, or selenium, from aqueous solutions.

For the purposes of the present invention, heavy metals or precious metals are the elements of the Periodic Table with serial numbers from 22 to 30, from 42 to 50, and also from 74 to 83.

The novel ion exchangers and bead polymers, moreover, may be used for purifying or treating water from the chemical industry or electronics industry, or else from the food or drink industry, particularly for preparing ultrahigh-purity water, ultrahigh-purity chemicals or preparing starch or hydrolysis products thereof.

The novel ion exchangers and bead polymers may moreover be used for purifying wastewater streams from the chemical industry, or else from waste-incineration plants. Another application of the novel adsorbers is the purification of landfill run-off water.

The novel ion exchangers and bead polymers may also be used for treating drinking water or groundwater. However, the novel bead polymers and/or ion exchangers may also serve as a starting material for other poly(meth)acrylic acid derivatives, by reactions such as:

reaction with 1-N,N-dimethylamino-3-aminopropane (amine Z) to give acrylamide resins, which products may be partially or completely quaternized and serve for treatment of water or of sugar, reaction with polyamines, such as diethylenetriamine or triethylenetetramine, to give highly sulfate-selective resins, or reaction with amino sugars (e.g. N-methylglucamine) to give boron-selective resins.

The novel ion exchangers are prepared in a number of steps and are illustrated using the examples below.

EXAMPLES

Example 1

The polymerization took place in a 3 liter flat-flange-jointed glass vessel with a wide flat-flange-jointed vessel stirrer, Pt 100 temperature sensor, reflux condenser, 500 ml dropping funnel and thermostat with control unit.

| | Aqueous phase |
|---|---|
| 1.184 g | hydroxyethylcellulose in |
| 126 ml | demineralized water |
| 196.8 g | sodium chloride (technical) in |
| 592 ml | demineralized water |
| 0.414 g | Na salt of naphthalenesulfonic acid-formaldehyde condensate (95% strength) in |
| 77 ml | demineralized water |
| | Organic phase |
| 760 g | acrylonitrile |
| 40 g | diethylene glycol divinyl ether |
| 2.13 g | dibenzoyl peroxide (75% strength) |

The hydroxyethylcellulose is sprinkled into demineralized water and stirred for at least 8 h to prepare the aqueous phase. The sodium chloride solution is an initial charge in the polymerization vessel. The hydroxyethylcellulose solution is added to the sodium chloride solution. The sulfonic acid solution is stirred for 15 min and then added into the polymerization vessel. The entire aqueous phase is stirred for a further 30 min.

The organic phase is stirred for 15 min at room temperature and then, with the stirrer stopped, added to the aqueous phase. The mixture then stands for 20 min, without stirring, and is then stirred for 20 min at 170 rpm at room temperature.

The mixture is heated to 72° C. within a period of 90 min with stirring. The start of the reaction can be recognized via a change in the color (from cloudy to milky white). The heat of reaction generated is dissipated via the glass vessel's jacket, which has a connection to the thermostat. Peaks in the reaction are intercepted by adding portions of cold water. The total reaction time at 72° C. is 5 h. The mixture is then heated to 90° C. within a period of 1 h and held for 5 h at this temperature. The mixture is then cooled and mixed with 300 ml of 10% strength aqueous sodium bisulfite solution and stirred for 1 h at 80° C. The resin is then washed through on a 100 mesh screen, using demineralized water.

Yield: 1180 ml of resin, dry yield: 98.4%

Effective particle size: 0.278 mm, coefficient of uniformity: 1.625 (determined optoelectronically)

Example 2

Prior to the alkaline hydrolysis, 500 ml of resin prepared as in Example 1 were transferred into a heatable glass-frit column, followed by annealing at 80° C. for 1 h. The resin was then eluted at 80° C. with 1 bed volume ("BV") of hot demineralized water over a period of 30 min, followed by another 1 h of annealing. The annealing was repeated 4 times, and the elution was repeated 3 times.

The resin treated in this way was hydrolyzed in a 3 liter $V_4A$ autoclave with stirrer and temperature control.

| | |
|---|---|
| 500 ml | resin (moist from filtration) |
| 727 ml | demineralized water |
| 143 ml | 45% strength NaOH (1st part) |
| 655 ml | 45% strength NaOH (2nd part) |
| 150 ml | demineralized water |
| 670 ml | demineralized water |

Resin and water form the initial charge in the autoclave and were heated to 150° C. The 1st part of the NaOH was pumped in within a period of 120 min. The 2nd part of the NaOH was then added within a period of 100 min, rapidly followed by 150 ml of water. Stirring of the mixture at 150° C. continued for 3.5 h. The pressure must be held at not more than 4.5 bar during the pumping-in and the continued stirring. The ammonia produced was released via a glass receiver charged with water. Once the continued stirring had ended, the mixture was cooled to 100° C. and then the pressure released over a period of 40 min. With the valve open, 670 ml of water were pumped in. Finally, the mixture was again stirred for 1 h at 100° C. with the valve open. After cooling to room temperature, the resin was removed and washed through on the screen.

The resin was then transferred to a heatable column. Conversion to the H form took place at 90° C. with 2 BVs of 10% strength $H_2SO_4$. The first BV was added within a period of 1 h, and the second BV was allowed to stand on the resin for 4 h. The resin was then washed 90° C. with water until neutral.

Volume of H form: 1050 ml

Effective particle size: 0.49 mm, uniformity coefficient: 1.67

Total capacity: 4.76 eq/l

Volume change: H/Na form (66%), H/Ca form (−2%)

Swelling water: 49.7%, dry weight: 371 g/l, bulk density: 738 g/l

For further purification the resin moist from filtration was heated to 150° C. together with the same volume of demineralized water in an autoclave ($V_4A$), and stirred at this temperature for 5 h. The water present in the autoclave was removed under pressure through a frit tube and replaced by suction with the same amount of fresh water while the stirrer was stopped. This was followed by heating again to 150° C. and repeating the purification, with stirring. The resin was treated for a total of 3 times at 150° C. with water, for 5 h each time, followed by cooling to room temperature and washing through the resin on a screen.

Example 3

The resin had the following changes and was polymerized as in Example 1:

Crosslinking agent: 38 g of diethylene glycol divinyl ether and 29.6 g of divinylbenzene (81% strength)

Polymerization temperature 1st stage: 70° C.

Stirrer rotation rate: 160 rpm

Yield: 1120 ml of resin, dry yield: 90.6%

Effective particle size: 0.421 mm, uniformity coefficient: 1.585 (determined optoelectronically)

Hydrolysis took place as in Example 2 with 750 ml of resin moist from filtration.

Volume of H form: 1420 ml

Effective particle size: 0.56 mm, uniformity coefficient: 1.48

Total capacity: 4.62 eq/l

Volume change: H/Na form (68%), H/Ca form (2%)

Useful capacity: 1.95 eq/l (cocurrent method with Leverkusen, Germany, mains water, regeneration with 90 g/l of HCl)

Example 4

The resin had the following changes and was polymerized as in Example 1:

Crosslinking agent: 32 g of butanediol divinyl ether

Organic phase with 0.12 g of resorcinol

Polymerization temperature 1st stage: 70° C.

Stirrer rotation rate: 160 rpm and after 7 min at 70° C. increased to 180 rpm,

Yield: 1290 ml of resin, dry yield: 91.2%

Effective particle size: 0.427 mm, uniformity coefficient: 1.575 (determined optoelectronically)

Hydrolysis took place as in Example 2 with 500 ml of resin moist from filtration.

Volume of H form: 1060 ml

Effective particle size: 0.569 mm, uniformity coefficient: 1.586

Total capacity: 4.28 eq/l

Volume change: H/Na form (66%)

Characterization of the Copolymers

Copolymers are best defined by way of their copolymerization parameter $r_i$. In a kinetic model, the parameters represent ratios of rate constants for the addition of competing monomers onto a polymer radical.

$$PA\cdot + A \xrightarrow{k_{AA}} PA\cdot$$

$$PA\cdot + B \xrightarrow{k_{AB}} PB\cdot$$

$$PA\cdot + A \xrightarrow{k_{BA}} PA\cdot$$

$$PB\cdot + B \xrightarrow{k_{BB}} PB\cdot$$

The corresponding kinetic equations are:

$$v_{AA}=k_{AA}[PA][A]$$

$$v_{AB}=k_{AB}[PA][B]$$

$$v_{BA}=k_{BA}[PB][A]$$

$$v_{BB}=k_{BB}[PB][B]$$

In a binary copolymerization of monomer A and monomer B the system is described by two equations:

$$r_A=k_{AA}/k_{AB} \text{ and } r_B=k_{BB}/k_{BA}$$

The resulting instantaneous composition of the polymer is:

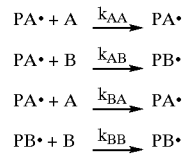

$$d[A]/d[B] = \frac{1+r_A([A]/[B])}{1+r_B([B]/[A])}$$

The above equation is best evaluated in the integrated form according to Meyer-Lowry as a function of the conversion (George Odian, *Principles of Polymerization*, John Wiley & Sons, 1981, page 464).

In the case of crosslinking copolymerization with a bifunctional crosslinking agent V instead of monomer B the equations obtained are as follows:

$$r_A = k_{AA}/2k_{AV} \text{ and } r_V = 2k_{VV}/k_{VA}$$

The factor 2 in both equations takes account of the fact that each molecule of crosslinking agent has two double bonds active in polymerization.

The overall reaction is described by the two rate constants $k_{AA}$ and $k_{VV}$ and the two copolymerization parameters $r_A$ and $r_V$. The rate constants $k_{AA}$ and $k_{VV}$ affect the overall reaction rate but not the composition of the copolymer. Since the monomer A is generally present in large excess over the crosslinking agent V, the rate of incorporation of the crosslinking agent is primarily determined by the parameter $r_A$. The effect of the parameter $r_V$ is of subordinate importance and can be neglected. In the ideal case the parameter $r_A$ has the value 0.5.

| $k_{AA}$ | $r_A$ |
|---|---|
| $r_V$ | $k_{VV}$ |

Determination of Copolymerization Parameter $r_A$

The polymerization was carried out with the composition in the mixing specification of Example 1 with the following changes:
- amount of crosslinking agent: 1, 2 and 4% by weight of diethylene glycol divinyl ether
- amount of hydroxyethylcellulose increased by 35%
- heating to 65° C. (polymerization temperature) within a period of 10 min
- stirrer rotation rate: 230 rpm, to 210–220 rpm after 1 h
- internal standard: toluene (1% based on total amount of monomer)

At regular intervals samples were taken, introduced into 5 to 10 times the amount of dimethyl sulfoxide (DMSO) and, with stirring, homogenized in an ice bath. The samples comprising DMSO were stirred overnight and then analyzed by gas chromatography to determine the residual monomer composition.

Fused silica capillary separating column of 30 m length, internal diameter 320 μm, film thickness 0.2 μm
Injection block temperature: 350° C.
Temperature phasing: 3 min at 50° C., then to 250° C. at 20 K/min and 5 min at 250° C.
The retention times for the individual components were:

| Acrylonitrile | 5.60 min |
|---|---|
| Toluene | 6.12 min |
| DMSO | 10.79 min |
| Diethylene glycol divinyl ether | 10.33 min |

The measurement points up to about 30% polymer conversion were used for evaluation and the parameters matched to the Meyer-Lowry equation. For this, the molar conversion was plotted against the composition of the monomer phase.

For the copolymerization parameter $r_A$ the value obtained was 0.47±0.015.

A ternary system with one monomer (in this case acrylonitrile, index A) and two crosslinking agents (indices 1 and 2) was fully characterized by the following parameters:

| $k_{AA}$ | $r_{A1}$ | $r_{A2}$ |
|---|---|---|
| $r_{1A}$ | $k_{11}$ | $r_{2A}$ |
| $r_{2A}$ | $r_{21}$ | $k_{22}$ |

If the concentration of the crosslinking agents is significantly smaller than that of monomer, the system becomes simpler. The composition of the copolymers is substantially determined by the two parameters $r_{A1}$ and $r_{A2}$, that is to say, the ternary system acrylonitrile/diethylene glycol divinyl ether/divinylbenzene behaves like two separate binary systems acrylonitrile/diethylene glycol divinyl ether and acrylonitrile/divinylbenzene. The two crosslinking agents have practically no effect on each another.

For acrylonitrile/diethylene glycol divinyl ether, $r_{A1}$=0.635±0.015 and for acrylonitrile/divinylbenzene (m-isomer), $r_{A2}$=0.05±0.001, and for acrylonitrile/divinylbenzene (p-isomer), $r_{A3}$=0.028±0.01.

Definition of Homogeneous Networks

The networks of the novel bead polymers and ion exchangers were substantially determined by the copolymerization parameter $r_A$, which is typically 0.5 for the ideal case of a bifunctional crosslinking agent. For homogeneous networks in the sense of the invention, $r_A$ is from 0.3 to 0.8, preferably from 0.4 to 0.65 (bifunctional crosslinking agent). Surprisingly, adding aliphatic nitriles in the sense of the present invention gave copolymerization parameters $r_A$ which were very close to the ideal value of 0.5, indicating that the networks are very substantially homogeneous.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

Illustration of the Parameters in Matrices

The matrices (2×2 for the binary copolymerization of monomer A and crosslinking agent V; 3×3 for the ternary copolymerization of monomer A and crosslinking agents 1 and 2) are intended to illustrate diagrammatically the parameters required for the kinetic definition of the two copolymerization reactions. The copolymerization parameters ri (binary) and rij (ternary) represent the relative rate constants for the addition of 2, 3 or more monomers to a growing polymer radical. The reactivity (rate constant) of this polymer radical with a monomer is—according to a simplifying assumption—determined exclusively by the monomer last incorporated (in our case acrylonitrile or a crosslinking agent). In the case of binary copolymerization 2 polymer radicals are present to each of which 2 monomers (in the present case acrylonitrile and the crosslinking agent) can add, i.e. there are 4 rate constants (2×2). In ternary copolymerization (in the present case acrylonitrile plus crosslinking agents 1 and 2) 3 polymer radicals are present which can react with 3 monomers (acrylonitrile plus crosslinking agents 1 an 2), i.e. 9 rate constants (3×3) are involved in this case. The addition of a monomer to its polymer radical, e.g. acrylonitrile to the polymer radical with a terminal acrylonitrile group, does not produce any change in composition, but determines the overall rate of polymerization. High ki values (binary) and kii values (ternary) signify rapid polymerization and low ki and kii values signify slow polymerization.

What is claimed is:

1. A process for preparing crosslinked ion exchangers comprising
   (a) polymerizing unsaturated aliphatic nitrites with di- or polyvinyl ethers as crosslinking agents and also with initiators in suspension in the presence of protective colloids, but not by a seed/feed process, to give bead polymers, and
   (b) functionalizing the resultant bead polymers to give ion exchangers.

2. A process according to claim 1 wherein other monovinyl compounds and/or crosslinking agents and/or porogen are added to the polymerization reaction mixture.

3. A process according to claim 1 wherein the unsaturated aliphatic nitrites have the formula (I)

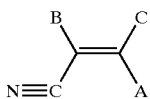

(I), wherein each of A, B, and C, independently of the others, represents hydrogen, alkyl, or halogen.

4. A process according to claim 1 wherein the crosslinking agent is
   (1) a divinyl ether having the formula (II)

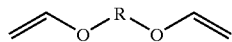

(II), wherein
R represents a radical selected from the group consisting of $C_nH_{2n}$, $(C_mH_{2m}-O)_p-C_mH_{2m}$, and $CH_2-C_6H_4-CH_2$,
n is $\geq 2$,
m is from 2 to 8, and
p is $\geq 2$, and/or
   (2) a polyvinyl ether comprising a trivinyl ether of glycerol or trimethylolpropane or a tetravinyl ether of pentaerythritol.

5. A process for preparing weakly acidic cation exchangers comprising
   (α) polymerizing unsaturated aliphatic nitrites of the formula (I)

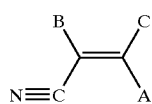

(I), wherein each of A, B, and C, independently of the others, represents hydrogen, alkyl, or halogen, with di- or polyvinyl ethers and, optionally, further crosslinking agents and initiators in suspension in the presence of protective colloids, to give bead polymers,
   (β) subjecting the bead polymer to alkaline hydrolysis, and
   (γ) subjecting the hydrolyzed bead polymers to ion-exchange from the salt form into the H form by dilute mineral acid.

* * * * *